Patented Apr. 18, 1944

2,346,968

UNITED STATES PATENT OFFICE 2,346,968

TYPOGRAPHIC PRINTING INK

Francis J. Jeuck, Chicago, and Charles A. Rietz, Park Ridge, Ill., assignors to Interchemical Corporation, New York, N. Y., a corporation of Ohio No Drawing. Application September 15, 1942, Serial No. 458,456

2 Claims. (Cl. 106—30)

This invention relates to printing inks which can be set or dried by the application of water thereto, and aims to provide an ink of this type characterized by improved press-stability, printing properties and toughness of film, as compared with previously known inks of the same type.

Inks which may be dried by the application of water upon the freshly printed film and methods of printing with such inks are disclosed and claimed in Gessler et al. Patent No. 2,157,385, dated May 9, 1939. Such inks contain a water-soluble solvent, usually a polyglycol or a polyether alcohol. When water is sprayed upon or otherwise added to a printed film of an ink of this character, it causes the ink binder to be precipitated so that upon evaporation or removal of the solvent and water, such as by penetration into the paper, the ink is substantially dry. Due to the fact that the solvents best suited for use in these inks are hygroscopic, difficulties in operation are encountered when the weather is humid.

Various methods have been suggested to overcome this problem, among others the use of rosin modified by the diene addition of maleic or fumaric acid (U. S. Patent No. 2,244,103, June 3, 1941). While these improved inks are less susceptible to precipitation difficulties in humid weather, they leave much to be desired in printability. In particular, the flow of the inks and the wetting properties of such vehicles are apt to be poor, resulting in poor impressions from halftones.

We have discovered that improved water setting inks can be made by combining the polybasic acids obtained by the diene reaction of rosin or a rosin derivative with maleic or fumaric acids, or other alpha beta unsaturated polybasic acids with fatty acids, or bodied vegetable oils to obtain a resin soluble in polyglycols, and using these resins, dissolved in water-soluble polyglycols, and water-soluble polyglycol derivatives, as ink vehicles. These vehicles are not only less water-sensitive than the prior art vehicles, but the inks flow out and print better, and give better pigment binding.

Substantially any fatty acids can be used as the modifying acids, although drying oil fatty acids are most preferred. At least 5% based on total resin weight, is necessary to give a marked improvement; and not so much should be used as to render the resin insoluble in polyglycols. About 25% of the total resin appears to be the upper limit for solubility, with drying oil acids or bodied vegetable oils.

Typical examples of the invention are the following:

Example 1—Varnish

| | Pounds |
|---|---|
| Rosin | 400 |
| Fumaric acid | 100 |
| Linseed oil fatty acids | 80 |
| Glycerine | 8 | reacted at 465° F. for 2 hours; water is evolved, and the melting point rises to 170° F.—ball and ring method. At this stage, the resin is dissolved in 300 pounds diethylene glycol. The varnish contains 60% solids.

Example 2—Varnish

| | Pounds |
|---|---|
| Rosin | 1,000 |
| Fumaric acid | 250 |
| #3 Linseed varnish (heat bodied) | 200 |
| Glycerine | 20 | are heated to 465° F. and held 1½ hours. 106 pounds diethylene glycol are then added.

Example 3—Varnish

| | Pounds |
|---|---|
| Rosin | 240 |
| Fumaric acid | 60 |

Heat to 460° F. and hold 1½ hours. Cool to 300° F., and add 40 pounds #3 heat bodied linseed oil. Hold at 300° F. until clear, and add 200 pounds diethylene glycol.

The highly acid linseed oil reacts with the rosin fumaric acid condensate to form an oil-modified reaction product.

Typical of the inks made from the above varnishes are the following:

Example 4—Black ink

| | Pounds |
|---|---|
| Carbon black | 16.0 |
| Iron blue | 4.7 |
| Methyl violet | .3 |
| Triethanolamine | 2.1 |
| Varnish of Example 1 | 61.7 |
| Diethylene glycol | 15.2 |

This ink prints better than a similar ink made from a resin containing no modifying acids.

Example 5—Reddish orange ink

| | Pounds |
|---|---|
| Varnish of Example 2 | 250 |
| Diethylene glycol | 85 |
| Extender pigment | 80 |
| Chrome yellow | 10 |
| Lithol red | 65 |
| | 490 |

Examples can of course be multiplied indefinitely without departing from the scope of the invention as defined in the claims. In particular, other water-soluble polyglycols (e. g. propylene glycol, tetraethylene glycol, etc.) and their water-soluble derivatives (e. g. the mono-ethers) can be used to replace the diethylene glycol.

We claim:

1. A typographic printing ink characterized by its ability to be set by the addition of water to the film and by its improved printing characteristics, which comprises pigment dispersed in a vehicle, the essential binder of which is a resin comprising the reaction product of a rosin, an alpha beta unsaturated polybasic acid, and from 5–25%, based on total resin weight, of oil fatty acids, the resin being dissolved in a solvent of the group consisting of water-soluble polyglycols and water-soluble polyglycol derivatives.

2. A typographic printing ink characterized by its ability to be set by the addition of water to the film and by its improved printing characteristics, which comprises pigment dispersed in a vehicle, the essential binder of which is a resin comprising the reaction product of rosin, an acid of the group consisting of maleic and fumaric acid, and from 5–25% of drying oil acids based on total resin weight, the resin being dissolved in a solvent of the group consisting of water-soluble polyglycols and water-soluble polyglycol derivatives.

FRANCIS J. JEUCK.
CHARLES A. RIETZ.